United States Patent [19]

Kundert

[11] Patent Number: 4,722,669

[45] Date of Patent: * Feb. 2, 1988

[54] FAN SPEED CONTROLLER

[75] Inventor: Warren R. Kundert, Harvard, Mass.

[73] Assignee: Control Resources, Inc., Harvard, Mass.

[*] Notice: The portion of the term of this patent subsequent to Apr. 21, 2004 has been disclaimed.

[21] Appl. No.: 770,715

[22] Filed: Aug. 29, 1985

Related U.S. Application Data

[63] Continuation-in-part of Ser. No. 715,663, Mar. 25, 1985, Pat. No. 4,659,290.

[51] Int. Cl.$^4$ .............................................. F04B 49/10
[52] U.S. Cl. ...................................... 417/32; 318/334; 318/473; 236/DIG. 9
[58] Field of Search ................. 417/32, 14; 416/93 R; 310/68 C; 318/334, 473, 472; 361/379, 384; 236/DIG. 9

[56] References Cited

U.S. PATENT DOCUMENTS

| | | | |
|---|---|---|---|
| 3,353,078 | 11/1967 | Maynard | 318/334 |
| 3,543,119 | 11/1970 | Bauer et al. | 318/334 |
| 4,425,766 | 1/1984 | Claypole | 236/35 |

Primary Examiner—Carlton R. Croyle
Assistant Examiner—Donald E. Stout
Attorney, Agent, or Firm—Henry D. Pahl, Jr.

[57] ABSTRACT

The fan speed controller disclosed herein is particularly useful in the cooling of electronic equipment and provides a feedback control characteristic from an exhaust air temperature sensor such that the change in outlet temperature over the range of air flow rates is substantially equal to the change in temperature rise of typical heat generating devices in electronic equipment over that same range. Accordingly, device temperature is maintained substantially constant over a range of varying input air temperatures. Preferably, the controlled fan includes a d.c. motor which is energized in a pulsed d.c. mode to prevent stalling or instability at low flow rates.

4 Claims, 4 Drawing Figures

FAN SPEED CONTROLLER

This application is a continuation-in-part of U.S. application Ser. No. 715,663, now Pat. No. 4,659,290, filed Mar. 25, 1985 by Warren Kundert and entitled Fan Speed Controller.

Background of the Invention

The present invention pertains to the air cooling of electronic equipment and more particularly to a system for fan speed control which maintains substantially constant device temperature for varying inlet or ambient temperatures.

While variable speed or thermostatically controlled fans have been proposed heretofore, prior controller designs have not been well suited for cooling electronic equipment. Further, these prior art systems have not, in general, been responsive to the actual needs of an overall or complete system, particularly when such a system is to be installed in an office environment.

One problem which is engendered by the use of cooling fans for electronic equipment used in an office environment is the noise which such fans can generate. This problem is compounded by the tendency of electronic equipment designers to provide cooling for so-called worst case conditions. In other words, the designer will typically include sufficient air flow capacity to deal with the densest system configuration, most heavily loaded on the hottest expected day. The air flow theoretically required for such worst case conditions will typically be much more than that required under typical or nominal conditions and the fans specified to provide such capability will generate excessive and unnecessary noise. It is, however, very important to assure sufficient cooling capacity since electronic systems, particularly those employing solid state components, are subject to various failures upon overheating.

As is understood by those skilled in the semiconductor art, maximum longevity of semiconductor devices can typically be expected if the devices are maintained at a substantially constant temperature. To a considerable extent, various prior art systems and the system described in the above-identified parent application Ser. No. 715,663 achieve these objectives to a degree by providing thermostatically or temperature controlled fans which vary air flow as a function of temperature for the purpose of providing cooling as needed without generating unnecessary noise. In order to take in account the heat generated by the apparatus being cooled, exhaust air temperature is typically monitored and used as the input for a feedback control system.

In accordance with conventional thinking in the control art, such air cooling systems have heretofore typically incorporated relatively high loop gains so that outlet air temperature is maintained as close as possible to a predetermined value, the set point. The present invention, however, recognizes that such tight control of outlet temperature is not the most desirable situation and provides an improved algorithm for maintaining heat producing devices at essentially constant temperature notwithstanding varying inlet or ambient temperatures. In this regard, the present invention is predicated on an understanding that the thermal resistance from junction to air of a typical semiconductor device varies with air velocity.

SUMMARY OF THE INVENTION

Apparatus in accordance with the present invention is adapted for air cooling electronic equipment of the type which incorporates a plurality of heat generating devices, e.g. integrated circuits packaged in DIPs (dual in-line packages). A variable speed fan, preferably driven by a d.c. motor, is provided for driving an air flow through the equipment. A sensor, such as a thermistor, is provided for sensing the temperature of air flow leaving the equipment. Circuit means are provided for variably energizing the fan such that the change in exhaust air temperature over the available range of air flow rates is substantially equal to the change in the temperature rise above air temperature of a typical one of the heat generating elements over that same range of air flow rates. Preferably, the fan motor is energized in a pulsed d.c. mode to prevent stalling at the low end of the range.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
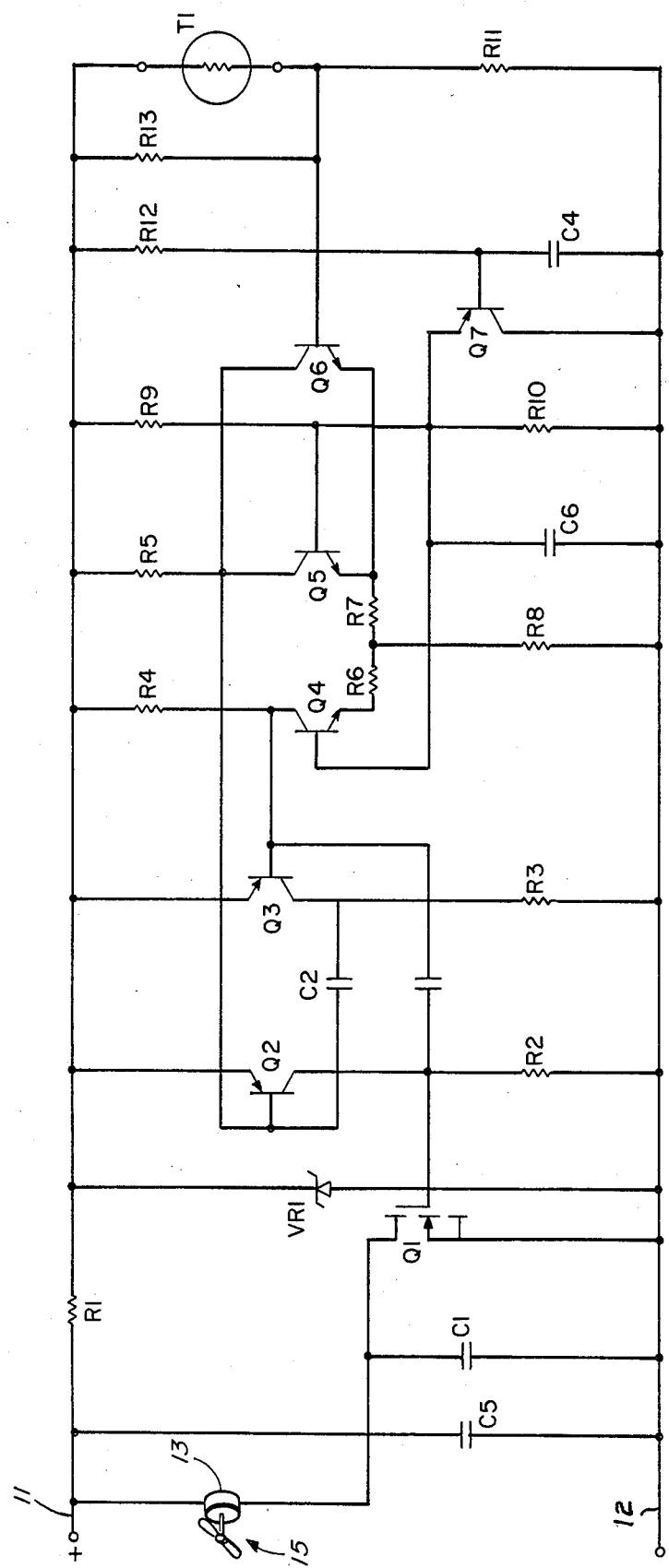
FIG. 1 is a circuit diagram of an improved fan speed controller constructed in accordance with the present invention.

Referring now to FIG. 1, the control circuit illustrated there is adapted for energizing a d.c. powered fan from d.c. supply leads. Such a fan, including a d.c. motor 13, is indicated generally by reference character 15 while positive and negative supply leads are indicated by reference characters 11 and 12 respectively.

While the use of d.c. powered fans for cooling electronic equipment is becoming increasingly prevalent, such d.c. fans have presented problems with respect to variable speed operation desired to reduce noise and maintain constant temperature. In particular, such fans have shown a tendency to stall when operated at low speeds, typically half their maximum or rated speed.

In accordance with one aspect of the present invention, it has been found that typical d.c. powered fans may be operated at speeds down to and below half their rated speed if the fan motor is energized in a pulsed d.c. mode from a full voltage source, rather than operated at a reduced but steady d.c. voltage. It has also been found that a relatively low pulsing frequency, e.g. 40 cycles per second, is necessary to avoid interference or beat effects with the motor's pole passage rate and to avoid the generation of acoustic noise from the motor's winding as would be the case if commonly used pulsing rates were applied, e.g. pulse rates such as those encountered in switching power supplies.

As may be seen from the circuit diagram of FIG. 1, the fan motor 13 is connected across the d.c. supply leads 11 and 12 through a switching mode power transistor Q1 of the field effect type. Transistor Q1 is shunted by a capacitor C1 to protect it from switching voltage transients. As is described in greater detail hereinafter, transistor Q1 is turned on and off by control circuitry which is shown on the right hand portion of the FIG. 1 schematic. The frequency of switching is at about 40 Hertz but the duty cycle, i.e. the proportion of time the transistor Q1 is on rather than off, is varied to effect the level of energization of the motor 13 and, consequently, the speed of the fan 15. A reduced and regulated voltage for the control circuitry is provided by means of a dropping resistor R1 and a zener diode VR1.

The timing of the switching mode of operation is determined by an astable multivibrator employing a pair of PNP transistors Q2 and Q3. The collector circuits of transistors Q2 and Q3 are provided with load resistors R2 and R3 respectively and the collector of each transistor is cross-coupled to the base of the other transistor in the pair by a coupling capacitor, C2 and C3 respectively. The collector of transistor Q2 is connected directly to the gate of the switching transistor Q1 so that transistor Q1 is turned on when transistor Q2 conducts.

As is understood by those skilled in the art, the transistors Q2 and Q3 conduct alternately with the frequency and relative durations of the alternate phases being determined by the rate at which the cross-coupling capacitors are recharged. Recharging of the capacitors C2 and C3 is provided through the collector or load circuits of a pair of NPN transistors Q4 and Q5 which are interconnected in a circuit which may be thought of as a differential amplifier or phase splitter, the emitters of the transistors Q4 and Q5 being connected, through respective resistors R6 and R7 and a common resistor R8, to the negative supply lead. The collectors of transistors Q4 and Q5 are also connected, through respective load resistors R4 and R5, to the positive supply lead. A nominal d.c. potential is provided to the base terminals of transistors Q4 and Q5 by a voltage divider comprising resistors R9 and R10 which essentially halve the supply voltage, this voltage level being filtered by a capacitor C6.

In the absence of external influences, the current flowing in the collector circuits of the transistors Q4 and Q5 will be about equal and thus the astable multivibrator comprising transistors Q2 and Q3 will operate at a duty cycle which is determined by the relative values of the cross-coupling capacitors C2 and C3. These values are selected to cause the fan to be energized at half speed, this being a sharply defined lower end of the control range. As is described in greater detail in the above-identified parent case Ser. No. 715,663, it is highly desirable that the range of control be quite sharply defined with a sharply defined minimum level of energization. In most circumstances, a minimum of about half speed is appropriate.

Transistor Q5, however, is shunted by a similar transistor Q6. The base of transistor Q6 is connected to a voltage divider comprising an air temperature sensing thermistor T1 and a resistor R11. Thermistor T1 is also shunted by a resistor R13 which sets a maximum value of resistance which will appear in that half of the divider. As indicated previously, thermistor T1 is mounted so that it is responsive to the temperature of the air flow being driven through the electronic equipment to be cooled by the fan 15. Air which has passed the typical or representative heat generating elements in the electronic equipment is conveniently referred to herein as "exhaust air" and the thermistor T1 is mounted to sense the temperature of such air. However, it should be understood that the air flow may pass and help cool other heat generating components before actually leaving the equipment enclosure.

As thermistor T1 is heated, its resistance decreases and, once the voltage at the junction J1 reaches the half supply level point, the transistor Q6 is turned on and begins to conduct, shunting the transistor Q5. Accordingly, the phase splitting circuit comprising transistors Q4 and Q5 will be progressively unbalanced, in turn causing transistor Q2 to conduct a greater proportion of the time within the cycle of the astable multivibrator. Correspondingly, the level of energization of the fan will be raised, since transistor Q1 is driven into conduction by conduction through transistor Q2. While the sense of this servo control is in a direction providing a feedback control system tending to reduce the effects of external changes on the temperature of the air sensed by the thermistor T1, the gain of the system is, in accordance with the present invention, carefully controlled to provide a predetermined response.

As will be understood by those skilled in the electronics art, the gain of the system may be selectively adjusted over a quite considerable range by appropriately choosing the values of resistors R6 and R7 in relation to the value of resistor R8.

Figure 4:
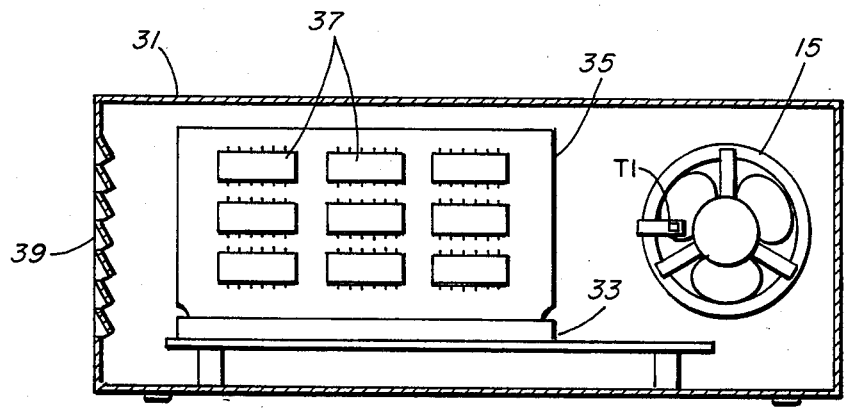

FIG. 4 illustrates electronic equipment of the type in which the improved fan controller of the present invention is useful. The equipment comprises an enclosure, designated generally by a reference character 31. Mounted within the enclosure 31 is a motherboard 33 into which one or more circuit cards 35 are plugged. As is typical, each circuit card 35 carries a plurality of semiconductor devices mounted in dual in-line packages 37. Cooling air is admitted to the interior of the enclosure 31 through a louver 39 and is drawn through the enclosure past the semiconductor devices 37 by the fan 15. The thermistor sensor T1 is mounted at the fan so as to respond to the temperature of the exhaust air leaving the equipment.

As indicated previously, the feedback control algorithm is, in accordance with the present invention, selected to maintain the temperature of the heat generating devices in the electronic equipment substantially constant, rather than to maintain a constant exhaust air temperature even though that is the actual parameter sensed by the thermistor T1. As also indicated previously, the thermal resistance of typical semiconductor devices changes as a function of air velocity. In this regard, thermal resistance may be taken as the ratio of temperature rise to power dissipation, temperature rise being defined as the difference in temperature from the surrounding air to the semiconductor junction.

Based on information provided by semiconductor manufacturers, the thermal resistance of a typical sixteen lead dual in-line package is 66 degrees centigrade per watt at 200 feet per minute air flow but is only 54 degrees centigrade per watt at 400 feet per minute air flow velocity. Assuming such a package which dissipates 250 milliwatts of electrical power (a quite representative value), the temperature rise at 200 feet per minute is 16.5 degrees centigrade and at 400 feet per minute is 13.5 degrees centigrade. The difference in the temperature rise for this two-to-one change in air velocity is thus three degrees.

Figure 2:
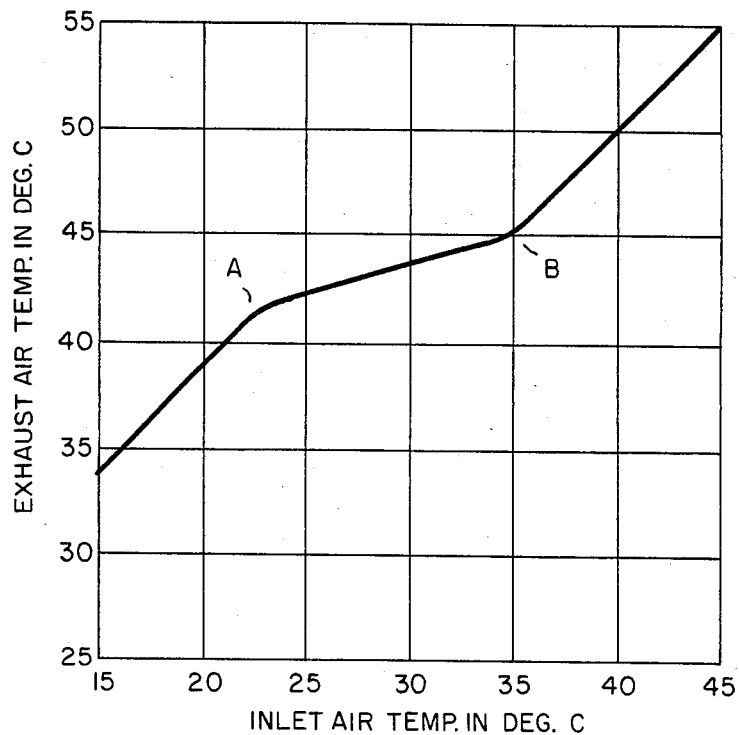
FIG. 2 is a graph representing the control characteristics of the circuit of FIG. 1.

The response of the circuit of FIG. 1 is tailored to match and essentially compensate for this three degree temperature rise difference over a two-to-one air flow ratio. FIG. 2 is a curve which represents the response of the system of FIG. 1 assuming that the thermistor T1 and resistor R11 are selected to provide a temperature above which fans run at maximum speed of 45 degrees centigrade, i.e. the upper end of the control range. The control range, i.e. the range over which proportional feedback control is exercised, is the portion of the curve between the points designated A and B. Below point A the fan runs at a steady speed of about half and above point B the fan runs at maximum speed. In the control range, however, which covers a two-to-one speed range as described previously, the difference in exhaust temperature is three degrees, that is, it matches the difference in temperature rise exhibited by a typical semiconductor device over the same range of air speed rates. It should be noted that this value is a difference in temperature rise not a temperature rise itself.

By providing a match between the system response and the change in thermal resistance, it is possible to maintain device temperature closer to a constant level than would be possible by merely holding exhaust air temperature constant. In other words, although the exhaust air temperature may vary as inlet or ambient air temperature varies, the temperature of a typical semiconductor junction will remain more nearly constant than the exhaust air temperature even though it is the exhaust air temperature which is being used as the sensed parameter in the control loop.

In order to assure that the fan 15 starts upon initial application of power, even if the ambient temperature is quite low, the system of FIG. 1 is arranged to cause full power to be applied for several tenths of a second when the system is initially energized. This function is provided by the transistor Q7, the capacitor C4, the resistor R12. When power is initially applied, the transistor Q7 conducts until the capacitor C4 is charged through the base of transistor Q7 and a resistor R12. Conduction through transistor Q7 lowers the voltage supplied to the base terminals of transistors Q4 and Q5 temporarily causing the transistor Q6 to conduct and which in turn causes full power to be applied to the fan.

Figure 3:
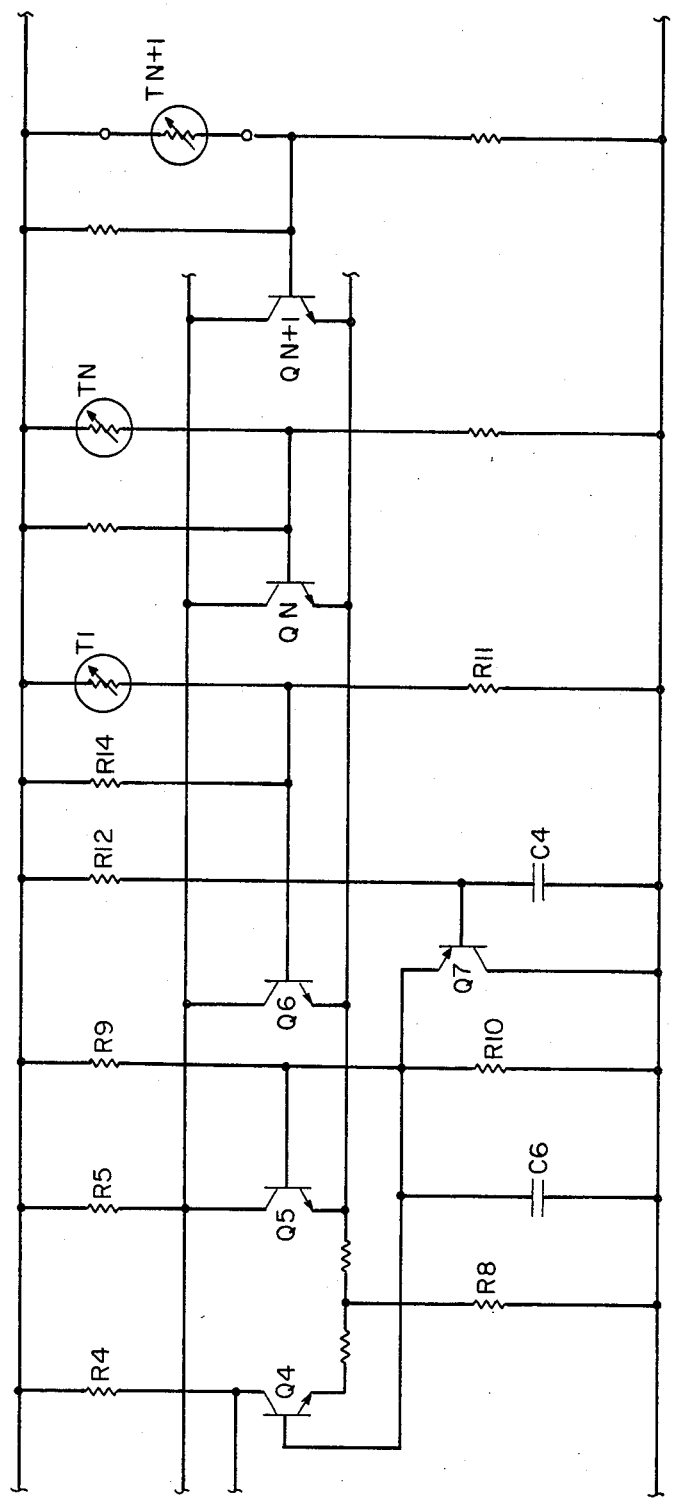
FIG. 3 is a circuit diagram of an alternative embodiment of the controller.

While the circuit of FIG. 1 provides optimal temperature control of representative or typical semiconductor packages, it will be understood by those skilled in the art that some electronic equipments may be atypical, e.g. including power transistors or multiple exhaust ports. To provide for such and similar contingencies, the circuit of FIG. 3 provides for additional temperature sensors. Such additional sensors, designated TN, TN+1, etc., are connected in separate, respective voltage divider circuits similar to that single one in FIG. 1 and each voltage divider circuit controls a respective transistor QN, QN+1, etc. These additional transistors are connected with their collector-emitter circuits across the collector-emitter circuits of Q5, i.e. in parallel with transistor Q6. Thus, these additional control signals are in effect logically ORed with the base or reference control signal which maintains the sharply defined minimum just as is the air temperature control signal provided by the thermistor T1. Thermistors TN, TN+1 may sense temperature at other exhaust ports or at other critical points or they may be connected directly to the cases of heat generating devices or to their heat sinks. Thus, if any one of these devices exceeds their respective threshold determined by the values in the respective voltage divider, increased air flow will be generated. In general, it will be understood that this functionality performs as a safety measure which is separate from and in addition to the main constant temperature maintaining function described previously.

In view of the foregoing, it may be seen that the several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for air cooling electronic equipment comprising a plurality of heat generating elements whose thermal resistance varies with air velocity, said equipment having a nominal power dissipation, said apparatus comprising:
   a fan for driving an air flow through the equipment;
   means for sensing exhaust air temperature of the air flow passing through the equipment;
   means for variably energizing said fan to provide rates of air flow spanning a predetermined range; and
   circuit means responsive to said sensing means for controlling said energizing means in a feedback system to provide a variable air flow responsive to the temperature of said sensing means, the gain being such that, over said range of air flow rates and at said nominal power dissipation, the change in exhaust temperature produced by changing inlet air temperature is substantially equal to the change in temperature rise of a typical one of said heat generating elements over said range of air flow rates.

2. Apparatus for air cooling electronic equipment comprising a plurality of heat generating elements whose thermal resistance varies with air velocity, said equipment having a nominal power dissipation, said apparatus comprising:
   a fan for driving an air flow through the equipment;
   means for sensing the exhaust air temperature of the air flow passing through the equipment;
   means for variably energizing said fan to provide rates of air flow spanning a two-to-one range; and
   circuit means responsive to said sensing means for controlling said energizing means in a feedback system to provide a variable air flow responsive to the temperature of said sensing means, the gain being such that, at said nominal power dissipation, the change in exhaust temperature over said range of air flow rates is three degrees centigrade.

3. Apparatus for controlling the energization, from a d.c. supply, of a fan having a d.c. motor, said apparatus comprising:
   a semiconductor d.c. switching device for selectively connecting said motor across said d.c. supply;
   a temperature sensing element;
   an astable multivibrator having alternating phases and operating at a nominal frequency of about forty Hertz;
   means responsive to said temperature sensing element for varying the relative durations of said phases thereby to vary the level of energization of said motor; and
   means controlled by said multivibrator for activating said switching device during one of the alternating phases of said multivibrator;
   whereby the speed of said fan will be controlled in response to said temperature sensing element over an appreciable range without stalling at low speed due to the pulsatile energization of said d.c. motor.

4. Apparatus for controlling the speed of a fan driving cooling air through heat dissipating electronic equipment, said apparatus comprising:

electronic power control means responsive to an input signal level for varying the energization of the fan motor;

means for generating a fixed level control signal corresponding to half maximum fan speed;

means, including an air temperature sensing element responsive to the temperature of exhaust air leaving the equipment, for generating a variable level control signal corresponding to the temperature of the exhaust air propelled by said fan;

means, including at least one other temperature sensing element, for generating another variable level control signal corresponding to each such other element;

OR circuit means operative to generate an output signal substantially equal to the greatest of any input signal applied thereto, said fixed and variable control signals being applied to said OR circuit as inputs with said OR circuit means output signal being applied to said power control means as the input signal level, whereby above half maximum fan speed is controlled as a function of temperature.

* * * * *